(12) United States Patent
Ciano et al.

(10) Patent No.: US 11,174,844 B2
(45) Date of Patent: *Nov. 16, 2021

(54) GENERATING ENERGY USING AIRFLOW FROM A MOVING ELEVATOR CABIN

(71) Applicant: International Business Machines Corporation, Armonk, NY (US)

(72) Inventors: Giuseppe Ciano, Rome (IT); Gianluca Della Corte, Rome (IT); Giuseppe Longobardi, Naples (IT); Antonio M. Sgro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 412 days.

This patent is subject to a terminal disclaimer.

(21) Appl. No.: 16/179,262

(22) Filed: Nov. 2, 2018

(65) Prior Publication Data

US 2019/0072076 A1 Mar. 7, 2019

Related U.S. Application Data

(63) Continuation of application No. 15/439,263, filed on Feb. 22, 2017, now Pat. No. 10,215,160.

(51) Int. Cl.
*B66B 9/00* (2006.01)
*F03D 9/00* (2016.01)
(Continued)

(52) U.S. Cl.
CPC ............... *F03D 9/25* (2016.05); *B66B 9/00* (2013.01); *B66B 11/0005* (2013.01);
(Continued)

(58) Field of Classification Search
CPC ......... B66B 11/0005; B66B 9/00; F03D 9/25; H02K 7/183; Y02B 10/30; Y02E 10/72; Y02E 10/725; F05B 2220/602
See application file for complete search history.

(56) References Cited

U.S. PATENT DOCUMENTS

| 5,341,902 A | 8/1994 | Ruiz, Sr. et al. |
| 6,626,267 B2 | 9/2003 | Beus et al. |

(Continued)

FOREIGN PATENT DOCUMENTS

| CN | 203009165 U | 6/2013 |
| KR | 10-1488792 B1 | 2/2015 |

OTHER PUBLICATIONS

Appendix P, "List of IBM Patents or Patent Applications Treated as Related", Mar. 26, 2020, 2 pages.

(Continued)

*Primary Examiner* — Tulsidas C Patel
*Assistant Examiner* — S. Mikailoff
(74) *Attorney, Agent, or Firm* — Michael A. Petrocelli; Hunter E. Webb; Keohane & D'Alessandro, PLLC

(57) ABSTRACT

Aspects of the present invention provide an approach for controlling energy generation by an airflow originating from a moving elevator cabin. Wing pressure pads are positioned outside the elevator cabin extending to walls of the elevator shaft for preventing an airflow in the elevator shaft from above the elevator cabin to an area in the shaft below the elevator cabin. The elevator shaft is pressure-tight, and the elevator shaft has, at one end of the elevator shaft, an air conduit in which a first power generator stage having a propeller-driven electrical power generator is positioned. The method further intercepts a floor selection for the cabin and disables the power generators if a floor difference from a current position of the elevator cabin to a target position of the elevator cabin is below a predefined threshold value.

20 Claims, 6 Drawing Sheets

(51) Int. Cl.
  *F03D 9/25* (2016.01)
  *H02K 7/18* (2006.01)
  *B66B 11/00* (2006.01)

(52) U.S. Cl.
  CPC ........ *H02K 7/183* (2013.01); *F05B 2220/602* (2013.01); *Y02B 10/30* (2013.01); *Y02E 10/72* (2013.01)

(56) References Cited

U.S. PATENT DOCUMENTS

| | | |
|---|---|---|
| 7,104,363 B2 | 9/2006 | Mori et al. |
| 7,554,278 B2 | 6/2009 | Wegner-Donnelly et al. |
| 8,260,274 B2 | 9/2012 | Moshir et al. |
| 8,356,698 B2 | 1/2013 | Zepke et al. |
| 8,963,359 B2 | 2/2015 | Evans et al. |
| 9,546,072 B2 | 1/2017 | Sonnenmoser |
| 9,834,406 B2 | 12/2017 | Mezzadri et al. |
| 9,914,617 B2 | 3/2018 | Horbrugger et al. |
| 10,215,160 B2 * | 2/2019 | Ciano ................ H02K 7/183 |
| 2003/0000778 A1 | 1/2003 | Smith et al. |
| 2011/0025064 A1 | 2/2011 | Park |
| 2011/0266096 A1 | 11/2011 | Nies |
| 2014/0196446 A1 | 7/2014 | Holley |
| 2015/0191329 A1 | 7/2015 | Moon |
| 2018/0237264 A1 | 8/2018 | Ciano et al. |
| 2019/0072076 A1 * | 3/2019 | Ciano ................ H02K 7/183 |

OTHER PUBLICATIONS

Shahare et al., "Regenerating the Energy from Building Lift", International Journal for Research in Emerging Science and Technology, vol. 2, Issue 4, Apr. 2015, 5 pgs.

De Almeida et al., "E4 Energy Efficient Elevators and Escalators", Intelligent Energy Europe, Mar. 2010, 122 pgs.

Salata, Anthony J., U.S. Appl. No. 15/439,263, Ex Parte Quayle Action dated Jul. 25, 2018, DE920160212US1, 11 pgs.

Salata, Anthony J., U.S. Appl. No. 15/439,263, Notice of Allowance dated Oct. 10, 2018, DE920160212US1, 5 pgs.

* cited by examiner

GENERATING ENERGY USING AIRFLOW FROM A MOVING ELEVATOR CABIN

RELATED U.S. APPLICATION DATA

The present patent document is a continuation of U.S. patent application Ser. No. 15/439,263, filed Feb. 22, 2017, entitled "CONTROLLING THE CREATING OF ENERGY USING AN ELEVATOR", the disclosure of which is incorporated herein by reference.

FIELD OF THE INVENTION

The invention relates generally to a method for energy generation, and more specifically, to a method for controlling energy generation by an airflow originating from a moving elevator cabin. The invention relates further to a related energy generation system and a computer program product.

BACKGROUND

Smart buildings are in vogue. In the last years, it has become a common requirement to build self-contained buildings. These buildings may be able to satisfy most of their own needs—in particular energy needs—by generating resources internally. This may be achieved by reusing energy from waste water, use of solar energy, garbage recycling to smart heating, and so on.

In modern cities, there exist a lot of tall buildings—like office buildings, hotels, shopping centers, administrative state-owned buildings—with several elevators, which may be used continuously and which may require continual electrical energy. Traditional elevators may just fulfill its purpose in moving up and down between floors and consuming electricity, but may not offer other advantages like helping to reduce energy consumption in a smart way.

SUMMARY

According to one aspect of the present invention, a method for controlling energy generation by an airflow originating from a moving elevator cabin may be provided. Wing pressure pads may be positioned outside the elevator cabin extending to walls of the elevator shaft that prevent airflow in the elevator shaft from above the elevator cabin to an area in the shaft below the elevator cabin. The elevator shaft may be pressure-tight. The elevator shaft may comprise, at one end of the elevator shaft, an air conduit in which a first power generator stage, comprising a propeller-driven electrical power generator, may be positioned. The method may also comprise intercepting a floor selection for the cabin and disabling the power generators if a floor difference from a current position of the elevator cabin to a target position of the elevator cabin is below a predefined threshold value.

According to another aspect of the present invention, an energy generation system using an airflow originating from a moving elevator cabin may be provided. The system may comprise wing pressure pads positioned outside the elevator cabin extending to walls of the elevator shaft that prevent airflow in the elevator shaft from above the elevator cabin to an area in the elevator shaft below the elevator cabin. The elevator shaft may be pressure-tight. The elevator shaft may comprise, at one end of the elevator shaft, an air conduit in which a first power generator stage comprising a propeller-driven electrical power generator is positioned. Furthermore, the system may comprise an intercepting unit adapted for intercepting a floor selection for the cabin and adapted for disabling the power generators if a floor difference from a current position of the elevator cabin to a target position of the elevator cabin is below a predefined threshold value.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
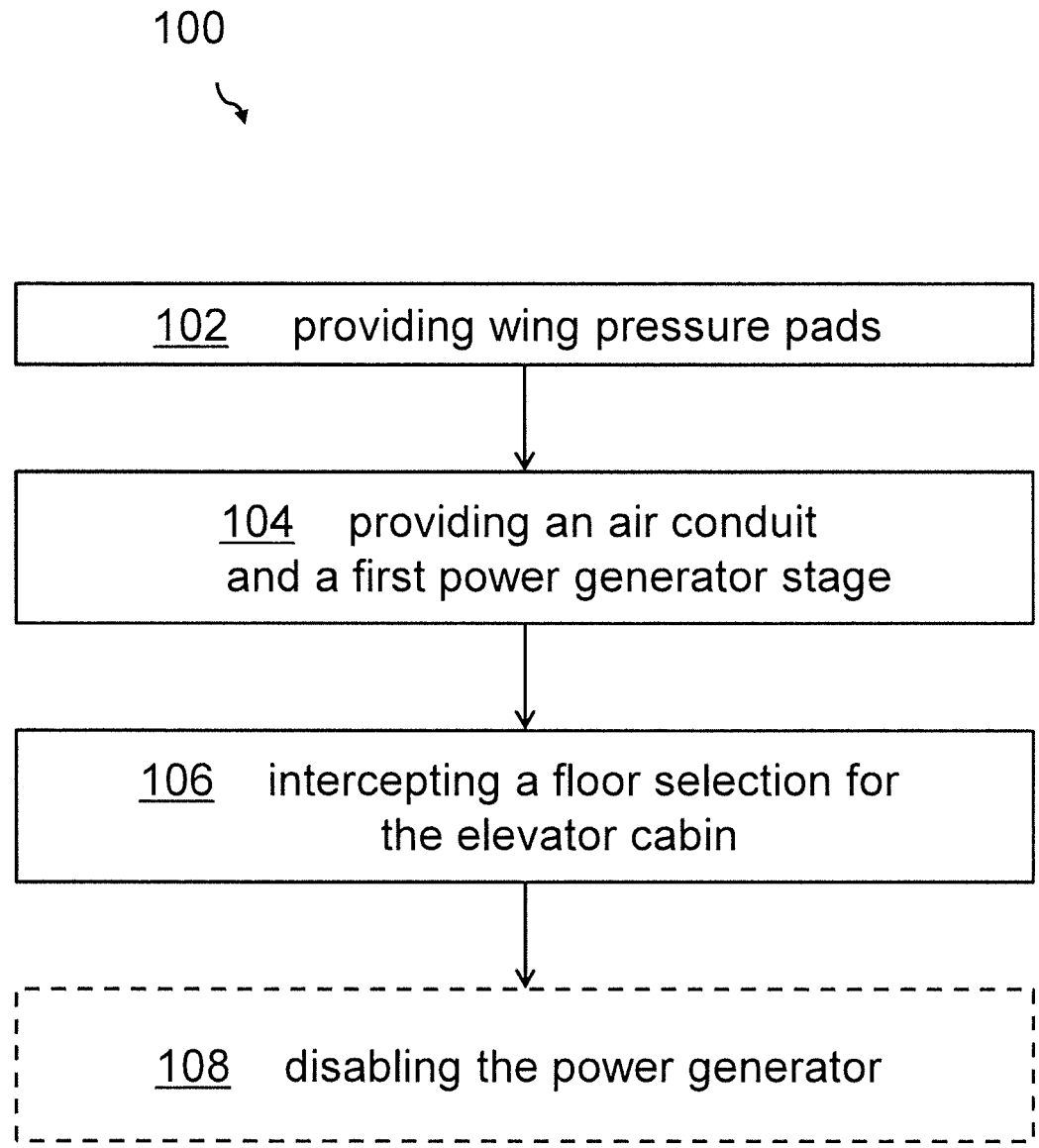

Preferred embodiments of the invention will be described, by way of example only, and with reference to the following drawings:

FIG. 1 shows a block diagram of an embodiment of the inventive method for controlling energy generation by an airflow originating from a moving elevator cabin.

Figure 2:
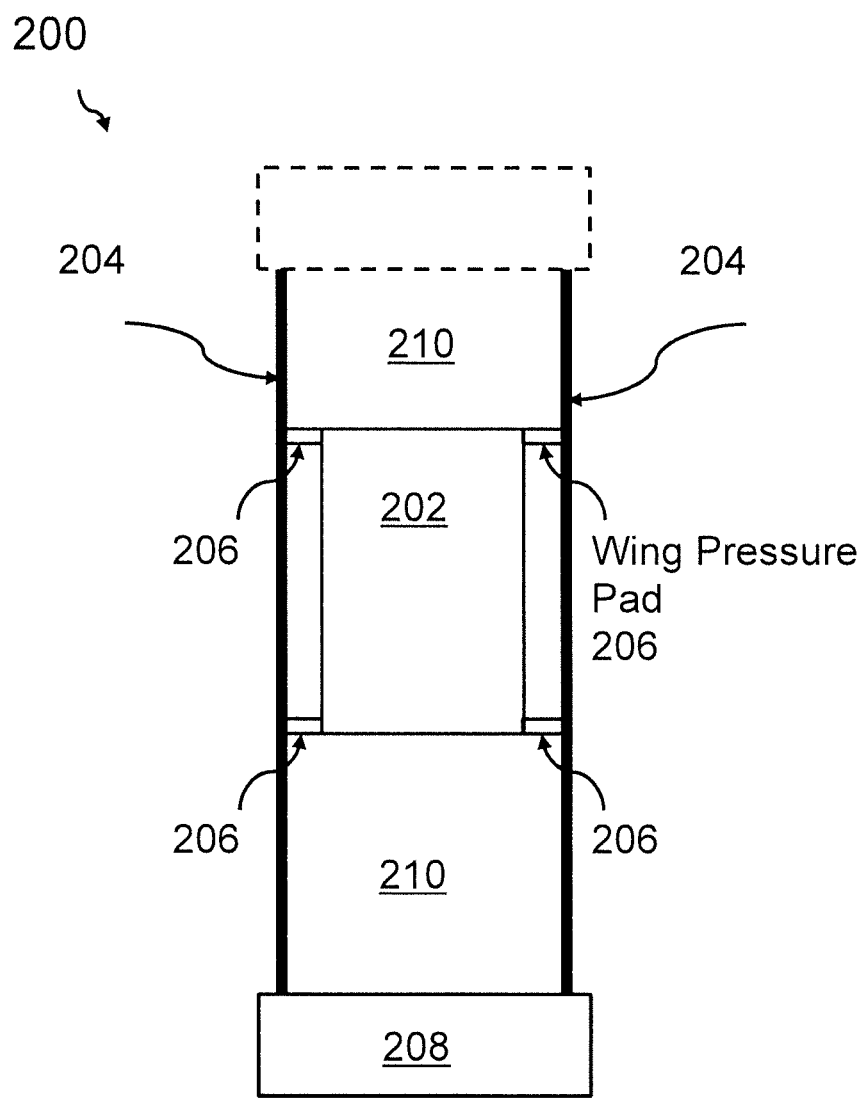

FIG. 2 shows a block diagram of an embodiment of an elevator cabin in an elevator shaft.

Figure 3:
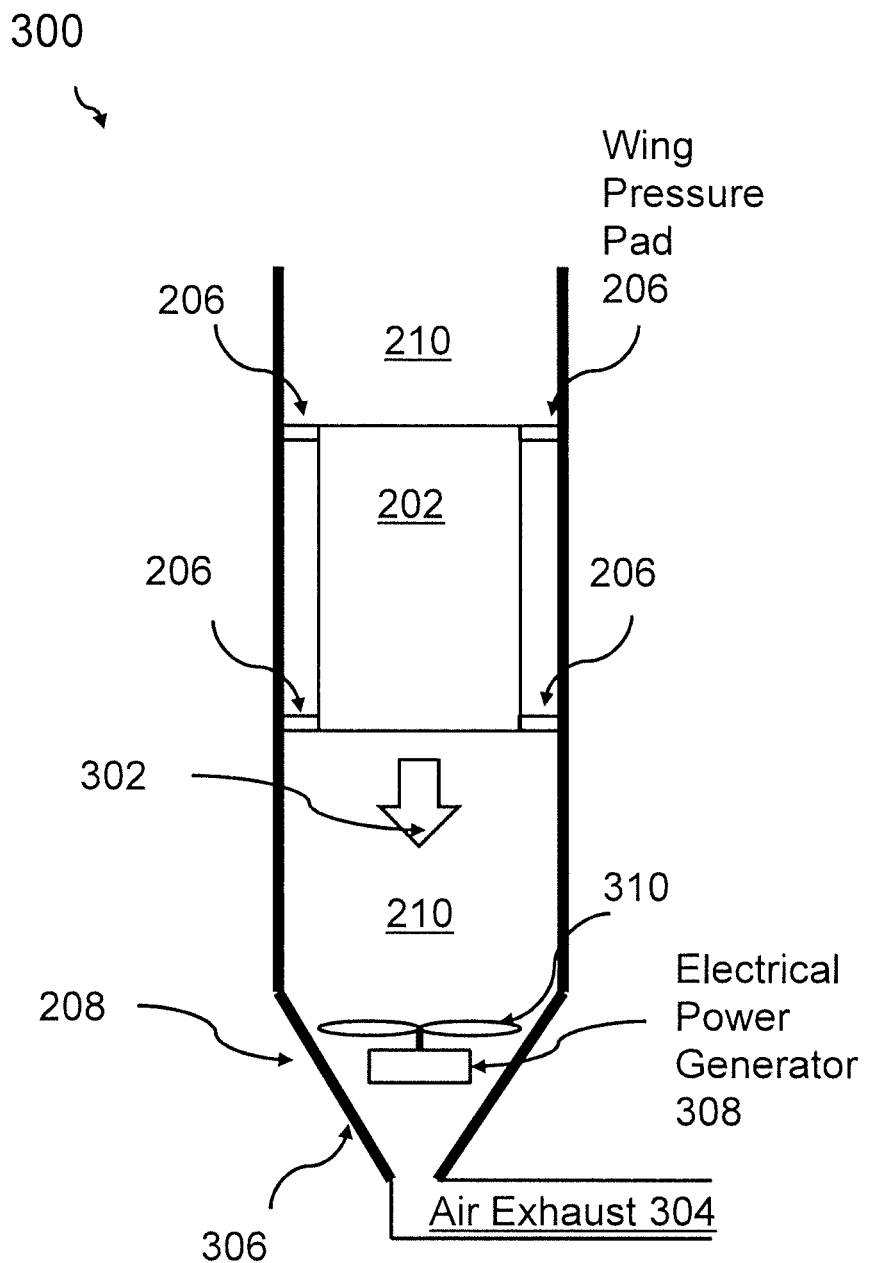

FIG. 3 shows a block diagram of an embodiment of the elevator shaft with a first power generating stage.

Figure 4:
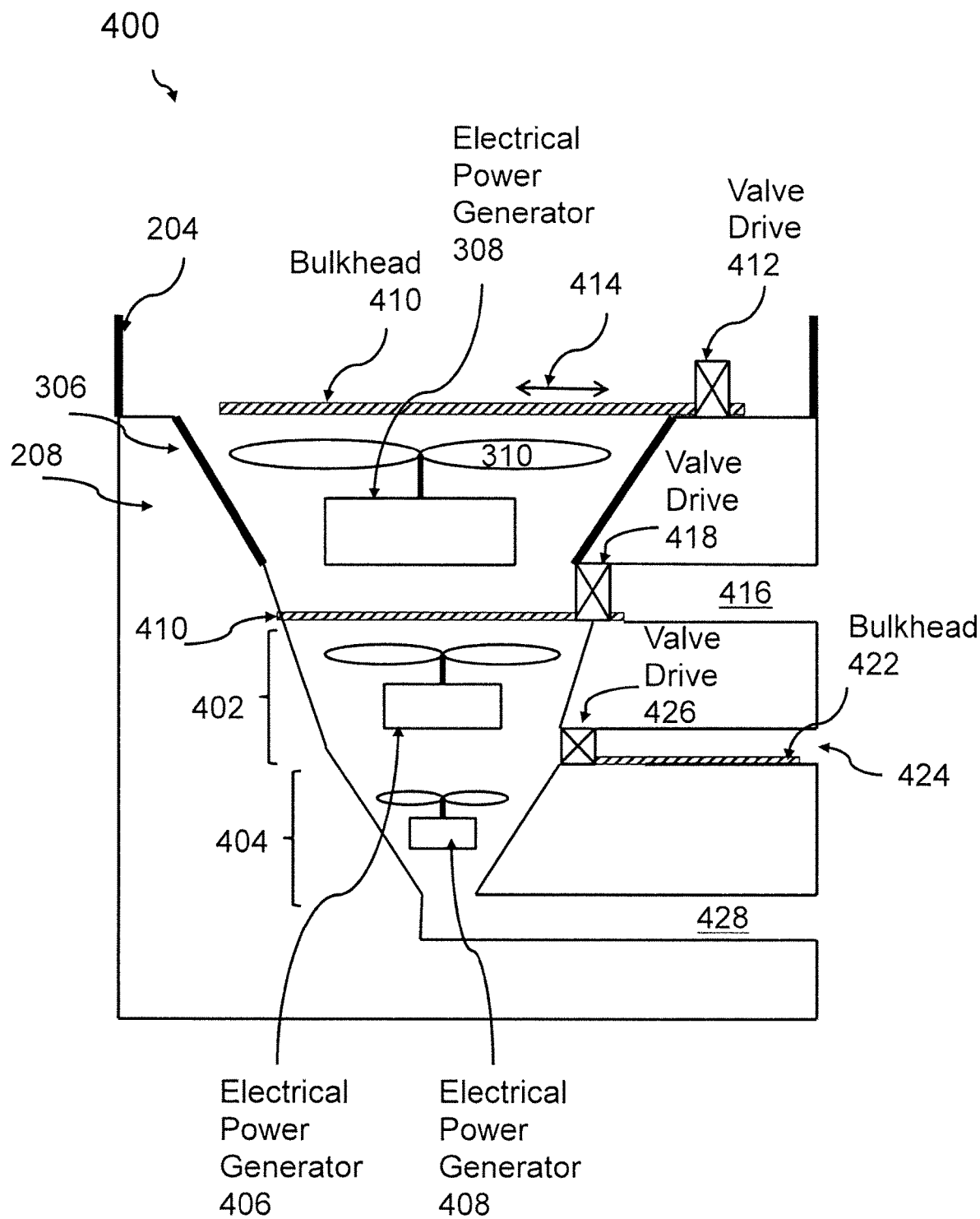

FIG. 4 shows an embodiment of the elevator shaft with multiple power generating stages.

Figure 5:
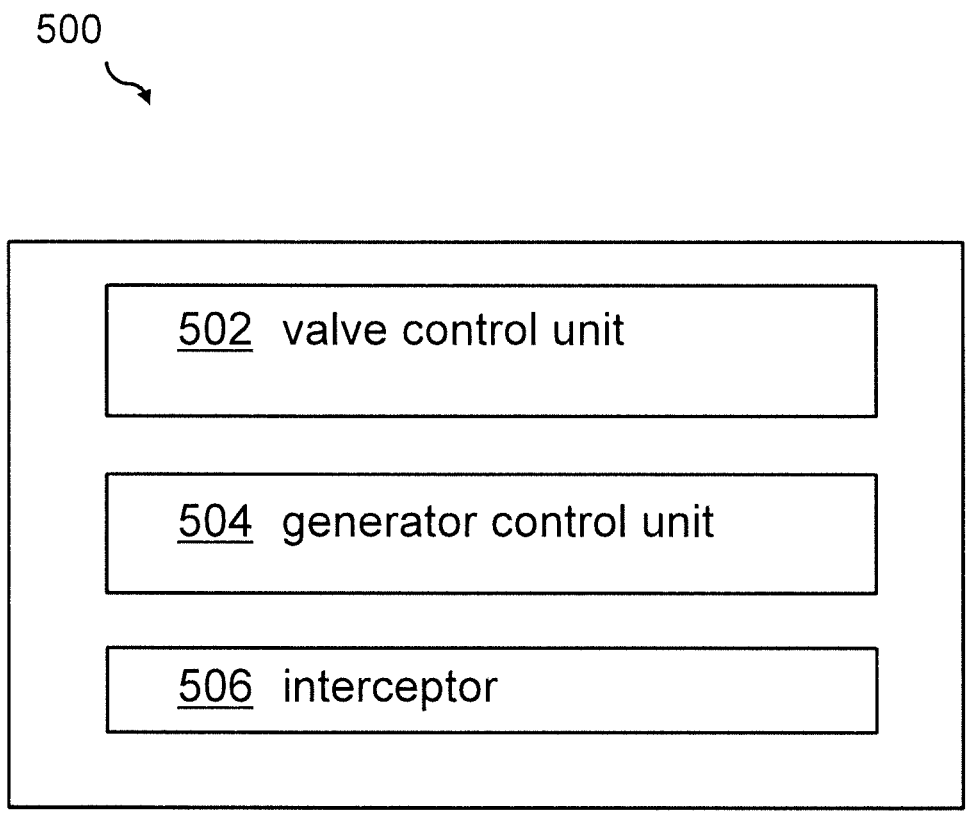

FIG. 5 shows an embodiment of a system for controlling energy generation by airflow.

Figure 6:
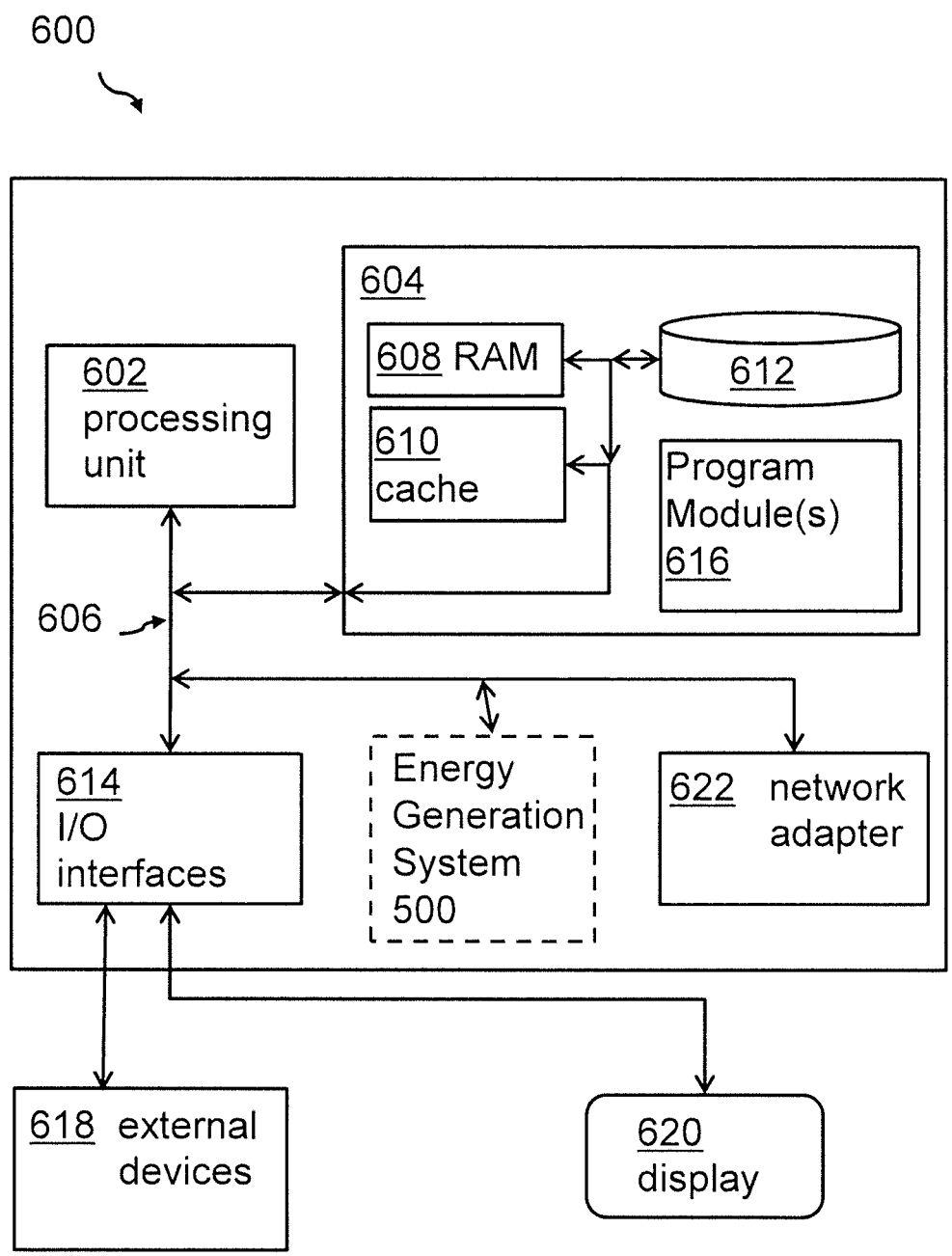

FIG. 6 shows an embodiment of a computer system comprising the part of the system for controlling energy generation.

DETAILED DESCRIPTION

In the context of this description, the following conventions, terms and/or expressions may be used:

The term 'elevator cabin' may denote a compartment for moving people or goods up and/or down in a tall building by means of an elevator or lift. The elevator cabin may have a door which may be opened at those floors the elevator cabin may stop for entering or stepping out of the elevator cabin. Actually, typical elevator cabin/elevator shaft combinations may have double doors that correspond to each other in position. The elevator cabin door may lie behind a floor door which may close the elevator shaft if the elevator cabin has moved away from the actual floor. In particular, the floor doors may be pressure-tight so that no air may be pressed out of the elevator shaft if the elevator cabin is moving.

The term 'wing pressure pads' may denote extensions of the elevator cabin reaching from an outer wall of the elevator cabin towards inner walls of the elevator shaft in order to make it pressure-tight. Under practical conditions, the pressure-tightness of the combination elevator cabin/bitter shaft may not be 100% or vacuum-tight. This is because the elevator cabin ought to move as frictionless as possible in its guiding rails of the elevator shaft.

The term 'power generator stage' may denote a combination of a generator for electrical energy, a propeller—coupled either directly or by means of the gearbox to the generator—and the air conduit.

The term 'propeller' may denote any apparatus or combination of apparatuses that move rotationally around an axis in response to a flow of air over a surface of thereof and can include, but is not limited to a hub and a set of airfoil-shaped blades.

The term 'intercepting' may denote an activity directed to read the target floor number in comparison to the actual floor number of the elevator shaft. Thus, the related intercepting unit may be enabled to generate an equivalent signal to the difference of floors between the actual floor of the elevator cabin and target floor without stopping the elevator cabin in between at intermediate floor levels.

The term 'floor selection' may denote the activity of selecting a target floor to which the elevator cabin should move.

The term 'bulkhead' may denote a separator positioned between an inbound portion and an outbound portion of an air conduit.

The proposed method for controlling energy generation by an airflow originating from a moving elevator cabin may offer multiple advantages and technical effects:

The here proposed system, as well as the related method, may use the potential energy of an elevator cabin when moving in an elevator shaft for generating—i.e., recuperation of—electrical energy. This energy may again be used for reducing the external electrical energy when moving the elevator cabin again upwards. It may be noted, that a turbine or propeller with reduced length of its wings (max. 3.2 m diameter) may produce up to a 1 kW/h at an average air flow velocity of 3.5 m/s.

The inventive concept is directed to usage in smart buildings. By intercepting the target floor selection, the system may determine how many floors the elevator cabin may be moved without being stopped in between. Depending on this, it may be determined whether to activate a power generation unit—or more ones of a power generation unit cascade—or not.

Additionally, the air column below or on top of the elevator cabin may be used for damping or braking purposes by means of the pneumatic effect if the elevator cabin is seen as a piston in the shaft of the elevator.

In the following, a series of additional embodiments of the proposed concept will be presented and discussed:

One preferred embodiment of the method may comprise generating a signal adapted for activating an air valve positioned between the end of the elevator shaft and the first power generator stage. The activation—i.e., the closing—may stop the airflow between the inside of the elevator shaft and the first power generation stage. The air may just flow out of the system as in a normal elevator. Alternatively, the activation may open the air valve so that the power generation stage may be activated. The decision between the alternatives opening/closing may be based on the difference between an actual and a target floor of the elevator cabin based on the floor selection.

According to one advantageous embodiment the method may comprise multiple power generation stages stacked in series in the air conduit and generating a power generation stage specific signal adapted for activating or deactivating—i.e., opening or closing—an air valve positioned between individual ones of the multiple power generation stages depending on the floor difference. Hence, a larger difference in floors—detected by the interceptor between an actual and target floor—may build more moving air which may be used for more than one power generation stage. If the elevator is only moved a limited number of floors—e.g., between a few floors—the moving air below or above the elevator cabin may only be enough for driving one power generation stage. Hence, the system is adaptable in terms of speed of the elevator cabin and in terms of a difference in floor levels when moving: i.e., actual floor versus target floor.

According to one permissive embodiment of the method, the end of the elevator shaft may be the top of the elevator shaft and/or the bottom of the elevator shaft. Thus, the power generation stage(s) may be positioned at the bottom of the elevator shaft—e.g., from the basement of the building—or on top of the elevator shaft. This way, architectural details of the building comprising the elevator shaft may be reflected in designing the power generator stages. Also, at both ends—i.e., on top and/or at the bottom—of the elevator shaft, power generator stage(s) may be positioned for an optimal efficiency of the power generation. This construction may of course allow using power generation stages on top of the elevator shaft and at the bottom of the elevator shaft to generate energy when the elevator cabin moves down. The top stage may use the inbound streaming air and the bottom power stage may use the outbound streaming air if the elevator cabin may move downwards.

According to one optional embodiment of the method, the method may also comprise generating a brake signal adapted for a stepwise closing of an air valve of the first power generating stage—or alternatively also further power generation stages—depending on the elevator cabin's position if the elevator cabin is a predefined number of floors away from the target floor. Thus, a signal may be generated depending on the difference between the target position of the moving elevator cabin in comparison to an actual position when moving. Depending on this difference, the valve may be closed in order to use the air column as an additional damping and braking mechanism, i.e., a dramatic brake with the elevator cabin has a piston.

According to a further optional embodiment of the method, the generated electrical energy by the one or more power generating stages may be stored, e.g., in rechargeable batteries. Thus, the electrical energy may be reused in order to move the elevator upwards, or for other purposes of the smart building.

According to one advantageous embodiment of the method, the air flow valve may comprise a bulkhead adapted to separate the elevator shaft and the power generation stage from each other. The same may apply to a bulkhead between different power generation stages.

According to one optional embodiment of the method, the elevator may be a high speed elevator. In the context of this document "high speed" may mean more than 10 m/s, e.g., between 10 and 20 m/s. However, also elevators with more than 20 m/s may advantageously use the here proposed concept.

According to another optional embodiment of the method, the elevator shaft may be embedded in a high-rise building. "High-rise" may denote here a building with more than 12 floors, e.g., a building with 12 to 49 floors. However, also building with more than 49 floors may use the here proposed concept. As a matter of fact, the efficiency of the inventive concept may increase with the speed and the height of the building in which the proposed concept is used.

In the following, a detailed description of the figures will be given. All instructions in the figures are schematic. Firstly, a block diagram of an embodiment of the inventive method for controlling energy generation by an airflow originating from a moving elevator cabin is given. Afterwards, further embodiments, as well as embodiments of the energy generation system using an airflow originating from a moving elevator cabin, will be described.

FIG. 1 shows an embodiment of a block diagram of the method 100 for controlling energy generation by an airflow originating from a moving elevator cabin in an elevator shaft. Wing pressure pads are provided, 102, and positioned outside the elevator cabin. The wing pressure pads may extend from outside of the elevator cabin towards walls of the elevator shaft. This may avoid airflow in the elevator shaft from above the elevator cabin to an area in the shaft below the elevator cabin when the elevator cabin moves. Furthermore, the elevator shaft should be pressure-tight, at least to a certain extent. This may mean that the door may be pressure-tight—at least to a certain extent—so that no other air conduits are present such that air may flow away outside the shaft without passing one of the power generation stages unless valves have been opened in order to allow an unobstructed and easy air flow, e.g., when the elevator cabin moves upwards.

The method comprises further providing, 104, an air conduit and a—e.g., first—power generator stage at an end of the elevator shaft. In each power generation stage a propeller-driven electrical power generator is positioned.

Advantageously, the method comprises intercepting, 106, a floor selection for the cabin—in particular when the cabin starts its way from one floor to another—and potentially disabling, 108, the power generator stage(s) if a floor difference from a current position of the elevator cabin to a target position of the elevator cabin is below a predefined threshold value. Thus, the power generation may only be used or activated if the elevator cabin will be moved a predefined number of floors after it starts is movement. This way, the elevator cabin may move fast between nearby floors without being slowed down by the energy generation because the air below or above the cabin may not be moved fast enough or may act as an artificial pneumatic brake. Additionally, the power generation stage may only be activated if a minimum of energy may be generable. Otherwise, the power generator may be used without generating energy which may increase the life span of the valves, bearings, etc., involved.

The floor selection may typically be activated by pressing a button indicating—inside the elevator cabin also from the outside—the target floor without any stop in between. Thus, a related controller may calculate the movement of the elevator cabin without any stops for a determination and prediction of the potentially generated energy. It may be noted, that the amount of generated energy may also depend on the number of people being loaded to the elevator.

FIG. 2 shows a block diagram 200 of an embodiment of an elevator cabin 202 in an elevator shaft 210. The elevator shaft 210 is surrounded by shaft walls 204 in which openings (not shown) may be provided in order to enter the elevator cabin 202 at different floors of the building. The elevator cabin 202 may have wing pressure pads 206 surrounding the elevator cabin 202 in order to separate air above the elevator cabin 202 from air below the elevator cabin 202. The wing pressure pads 206 extend from the elevator cabin 202 to the inside of the walls 204 of the elevator shaft 210. It may not be required that the wing pressure pads 206 completely seal the air passage surrounding the elevator cabin 202. However, on the other side, it may be useful if the wing pressure pads 206 are as tight as possible without generating additional friction between the elevator cabin 202—and in particular its guiding system within the elevator shaft 210—and the elevator shaft 210. There may be one or more layers of wing pressure pads 206 between the elevator cabin 202 and the walls 204 of the elevator shaft 210.

A power generation stage 208 may be positioned at the bottom—in particular in the basement of the related building—of the elevator shaft 210; or it may be positioned on top of the elevator shaft 210 (as shown by dotted lines).

FIG. 3 shows a block diagram 300 of an embodiment of the elevator shaft 210 with a first power generating stage 208 in a more detailed way. The elevator cabin 202 may move downwards (shown by the arrow 302) pushing the air below the elevator cabin 202 downwards in the direction of the power generating stage 208. The power generating stage 208 comprises an air conduit 306 which may end in the air exhaust 304. Inside the air conduit 306, a power generator 308 together with a vertically positioned rotatable propeller is positioned. If the elevator cabin 202 moves downwards, the moving air below the elevator cabin 202 may cause the propeller 310 to rotate which may generate electrical energy in the electrical power generator 308.

Additionally or in the alternative, another power generation stage may be positioned on top of the elevator shaft 210 which may use the air intake flow as energy source for driving a similarly constructed propeller/generator combination if the elevator cabin 202 moves downwards.

If the elevator cabin 202 moves upwards, a free airflow may be guaranteed by opening respective valves in the elevator shaft 210 and/or by retracting wing pressure pads 206.

FIG. 4 shows an embodiment 400 of an end of the elevator shaft with multiple power generating stages 208, 402, 404. The first power generating stage 208 has already been described above. The second power generating stage 402 also consists of a propeller coupled to an electrical power generator 406. The here shown third power generating stage 404 also comprises a propeller coupled to a generator 408.

Above the first power generating stage 208 a valve is positioned. It may consist of a bulkhead 410 which may be moved by the valve drive 412. It may move the bulkhead 410 horizontally—as shown by the double arrow 414—in order to close the passage between the inside of the elevator shaft 210 and the air conduit 306 for the power generating stages. An additional exhaust valve (not shown) at the bottom of the elevator shaft walls 204, but above the bulkhead 410 may allow that air may move into or out of the elevator shaft 210 if required—e.g., when the elevator cabin moves upwards.

If the top valve comprising the bulkhead 410 and the valve drive 412 is open, air being pushed down the elevator shaft 210—i.e., by the moving elevator cabin—may force the propeller 310 to rotate so that electrical energy is generated by the generator 308. The air may leave the system through the exhaust 416. The valve drive 418 may have a double function: opening/closing the way from the first power generation stage 208 to the exhaust 416 as well as moving the bulkhead 420 between the first power generating stage 208 and the second power generating stage 402. As illustrated herein, the bulkhead 420 is shown in a complete closed position.

The second power generation stage 402 and the third power generation stage 404 may be built analogously. There may also be a valve drive 426 for bulkhead 422 which is shown in an open position. Thus, the passage between the second power generation stage 402 and the third power generation stage 404 is open. A skilled person will also recognize the additional exhausts 424 and 428 may be provided for the second and third power generating stage, respectively.

As described above, the opening/closing of the bulkhead 410, 420, 422 may be controlled according to the potential power being generated depending on the floor levels of a start floor versus a target floor of the elevator cabin. An additional valve (not shown) may be positioned within the exhaust 428.

A symmetrically constructed multi-stage power generation unit, as described by FIG. 4, may be positioned at the other end of the elevator shaft 210, i.e., at the top end of the elevator shaft 210. Additionally, a skilled person will understand that more or less than three power generator stages may be used.

It should also be understood that it may be advantageously to open any available valve if the elevator cabin moves upwards in order not to increase the required power to lift the elevator cabin. Hence, the power generation may only be activated under practical conditions if the elevator cabin moves downwards, i.e., if potential energy of the cabin may be converted to kinetic energy which may then be converted to electrical energy in any of the power generating stages. It may also be noted that valves may be closed in an upward and/or core downwards direction of the cabin in order to use their related air column in the elevator shaft for breaking and/or damping purposes if the cabin comes close to the target floor.

FIG. 5 shows an embodiment of a system 500 for controlling energy generation by airflow. The system 500 may comprise a valve control unit 502 adapted for individually controlling the opening and closing of the different valves and/or bulkheads. A generator control unit 504 may control the delivery of the generated electrical power into a main power grid or into a cascade of batteries for storing the electrical power generated by the movement of the elevator cabin. Additionally, an interceptor unit 506 is part of the system 500. This interceptor unit intercepts a target floor selection for the elevator cabin before the elevator cabin starts to move to the target floor. Depending on the difference of the actual floor and the target floor—without intermediate stops—one or more of the power generating units may be activated by opening the respective bulkhead.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, parts of the energy generation system 500 using airflow originating from a moving elevator cabin may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for controlling generation of electrical energy from an airflow, the airflow originating from an elevator cabin moving in an elevator shaft, the method comprising:
    restricting the airflow in the elevator shaft from above the elevator cabin to an area in the shaft below the elevator cabin using a set of wing pressure pads positioned outside the elevator cabin;
    generating, using an electrical power generator, the electrical energy from the airflow in the elevator shaft caused by the moving elevator cabin, wherein the elevator shaft comprises, at an end of the elevator shaft, an air conduit in which a first power generator stage comprising the electrical power generator is positioned; and
    intercepting a floor selection for the cabin and disabling the power generator if a floor difference from a current position of the elevator cabin to a target position of the elevator cabin is below a predefined threshold value.

2. The method according to claim 1, further comprising:
    generating a signal adapted for activating an air valve positioned between the end of the elevator shaft and the first power generator stage.

3. The method according to claim 1, the first power generator stage being one of multiple power generator stages that are stacked in series in the air conduit, wherein the method further comprises:
    generating, depending on the floor difference, a power generator stage specific signal adapted to activate and deactivate at least one air valve of a plurality of air valves respectively positioned between individual ones of the multiple power generator stages.

4. The method according to claim 1, wherein the end of the elevator shaft is at least one of a top of the elevator shaft and a bottom of the elevator shaft.

5. The method according to claim 1, further comprising:
    generating a brake signal adapted for a closing of an air valve of the first power generator stage if the elevator cabin is a predefined number of floors away from the target position.

6. The method according to claim 1, further comprising:
    storing electrical energy generated by the first power generator stage.

7. The method according to claim 1, further comprising horizontally moving a bulkhead that separates the elevator shaft and the first power generator stage, wherein the horizontally moving closes a passage between an inside of the elevator shaft and the air conduit for the first power generator stage.

8. An energy generation system using an airflow originating from a moving elevator cabin in an elevator shaft, comprising:
    a set of wing pressure pads positioned outside the elevator cabin and extending from the elevator cabin to walls of the elevator shaft, the set of wing pressure pads restricting the airflow in the elevator shaft from above the elevator cabin to an area in the elevator shaft below the elevator cabin;
    a first power generator stage comprising an electrical power generator positioned in an air conduit at an end of the elevator shaft; and a controller configured to intercept a floor selection for the cabin and to disable the electrical power generator if a floor difference from a current position of the elevator cabin to a target position of the elevator cabin is below a predefined threshold value.

9. The system according to claim 8, further comprising:
an air valve positioned between the end of the elevator shaft and the first power generator stage.

10. The system according to claim 8, further comprising:
a second power generator stage stacked in series with the first power generator stage in the air conduit; and
an air flow valve positioned between the first power generator stage and the second power generator stage.

11. The system according to claim 8, where the end of the elevator shaft is at least one of a top of the elevator shaft and a bottom of the elevator shaft.

12. The system according to claim 8, the controller further configured to:
generate a brake signal adapted for a closing of an air valve of the first power generator stage if the elevator cabin is a predefined number of floors away from a target floor.

13. The system according to claim 8, further comprising:
a battery cluster that stores electrical energy generated by the first power generator stage.

14. The system according to claim 10, wherein the air flow valve is a bulkhead adapted to separate the elevator shaft and at least one of the first power generator stage and the second power generator stage.

15. A computer program product for controlling electrical energy generation by an airflow originating from an elevator cabin moving in an elevator shaft,
wherein wing pressure pads are positioned outside the elevator cabin and extend to walls of the elevator shaft to restrict the airflow in the elevator shaft from above the elevator cabin to an area in the shaft below the elevator cabin,
wherein the elevator shaft comprises, at an end of the elevator shaft, an air conduit in which a first power generator stage comprising an electrical power generator is positioned,
said computer program product comprising a non-transitory computer readable storage medium having program instructions embodied therewith, said program instructions being executable by at least one computing system to cause said at least one computing system to:
generate, using the electrical power generator, the electrical energy from the airflow in the elevator shaft caused by the moving of the elevator cabin;
intercept a floor selection for the cabin; and
disable the power generator if a floor difference from a current position of the elevator cabin to a target position of the elevator cabin is below a predefined threshold value.

16. The program product according to claim 15, the program instructions further causing said at least one computing system to:
generate a signal adapted for activating an air valve positioned between the end of the elevator shaft and the first power generator stage.

17. The program product according to claim 15, the first power generator stage being one of multiple power generator stages that are stacked in series in the air conduit, wherein the program instructions further cause said at least one computing system to:
generate, depending on the floor difference, a power generator stage specific signal adapted to activate and deactivate at least one air valve of a plurality of air valves respectively positioned between individual ones of the multiple power generator stages.

18. The program product according to claim 15, the program instructions further causing said at least one computing system to:
generate a brake signal adapted for a closing of an air valve of the first power generator stage if the elevator cabin is a predefined number of floors away from the target position.

19. The program product according to claim 15, the program instructions further causing said at least one computing system to:
store electrical energy generated by the first power generator stage.

20. The program product according to claim 15, wherein the elevator shaft and the first power generator stage are separated by a bulkhead adapted as an air flow valve.

\* \* \* \* \*